US012807847B2

(12) United States Patent
Bang et al.

(10) Patent No.: US 12,807,847 B2
(45) Date of Patent: Nov. 24, 2026

(54) ADDITIVE FOR EPOXY ADHESIVE AND COMPOSITION FOR STRUCTURAL EPOXY ADHESIVE COMPRISING THE SAME

(71) Applicants: PUSAN NATIONAL UNIVERSITY INDUSTRY—UNIVERSITY COOPERATION FOUNDATION, Busan (KR); KOREA UNIVERSITY RESEARCH AND BUSINESS FOUNDATION, Seoul (KR)

(72) Inventors: Joon Ha Bang, Seoul (KR); Jun Soo Moon, Busan (KR); Yoon Huh, Goyang-si (KR); Young Son Choe, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 565 days.

(21) Appl. No.: 18/264,908

(22) PCT Filed: Nov. 1, 2021

(86) PCT No.: PCT/KR2021/015493

§ 371 (c)(1),
(2) Date: Aug. 9, 2023

(87) PCT Pub. No.: WO2022/173088

PCT Pub. Date: Aug. 18, 2022

(65) Prior Publication Data

US 2024/0174900 A1 May 30, 2024

(30) Foreign Application Priority Data

Feb. 10, 2021 (KR) ........................ 10-2021-0019161

(51) Int. Cl.
*C08F 265/00* (2006.01)
*C08F 290/06* (2006.01)
(Continued)

(52) U.S. Cl.
CPC ........... *C09J 11/08* (2013.01); *C08F 290/064* (2013.01); *C09J 163/00* (2013.01); *C08F 265/00* (2013.01); *C08F 2400/02* (2013.01)

(58) Field of Classification Search
None
See application file for complete search history.

(56) References Cited

FOREIGN PATENT DOCUMENTS

| | | |
|---|---|---|
| KR | 101893690 | 8/2018 |
| KR | 20190121448 | 10/2019 |
| WO | WO 2015085428 | 6/2015 |

OTHER PUBLICATIONS

Teo, Y. C. et al., "Facile Synthesis of Macromonomers via ATRP-Nitroxide Radical Coupling and Well-Controlled Brush Block Copolymers". Macromolecules, 2018, 52(1), 81-87. (Year: 2018).*

(Continued)

*Primary Examiner* — Richard A. Huhn
(74) *Attorney, Agent, or Firm* — NORTON ROSE FULBRIGHT US LLP

(57) ABSTRACT

The present invention relates to an additive for an epoxy adhesive and a composition for a structural epoxy adhesive including the same. The additive for the epoxy adhesive according to the present invention may have excellent dispersibility and mechanical properties, and thus may improve adhesion strength of the structural epoxy adhesive.

7 Claims, 7 Drawing Sheets

(51) Int. Cl.
*C09J 11/08* (2006.01)
*C09J 163/00* (2006.01)

(56) References Cited

OTHER PUBLICATIONS

Moon, J. et al., "Reactive Core-Shell Bottlebrush Copolymer as Highly Effective Additive for Epoxy Toughening". Chinese Journal of Polymer Science, 2021, 39(12), 1626-1633. (Year: 2021).*
Busan National University, et al. Development of Source Technology for Ultra High Strength Hybrid Adhesive Materials. Global Frontier Business Final Report, Ministry of Science and ICT, Dec. 2017, pp. 1-70.
International Search Report and Written Opinion issued in Counterpart PCT Application No. PCT/KR2021/015493 dated Mar. 10, 2022 (English machine translation provided).
Li, Z. Well-defined molecular brushes: Synthesis by a "grafting through" strategy and self assembly into complicated hierarchical nanostructures. Doctor of philosophy in chemistry, Washington university in St.Louis. 2011, pp. i-141.

* cited by examiner

ADDITIVE FOR EPOXY ADHESIVE AND COMPOSITION FOR STRUCTURAL EPOXY ADHESIVE COMPRISING THE SAME

CROSS-REFERENCE TO RELATED APPLICATIONS

This application is a national phase under 35 U.S.C. § 371 of International Application No. PCT/KR2021/015493, filed Nov. 1, 2021, which claims the benefit of priority to Korean Patent Application No. 10-2021-0019161, filed Feb. 10, 2021, the entire contents of each of which are hereby incorporated by reference in their entirety.

FIELD OF THE INVENTION

The present disclosure relates to an additive for an epoxy adhesive and a composition for a structural epoxy adhesive comprising the same. More specifically, the present disclosure relates to an additive for an epoxy adhesive having excellent dispersibility and mechanical properties, and a composition for a structural epoxy adhesive comprising the additive.

DESCRIPTION OF RELATED ART

Epoxy resin has many excellent properties in terms of adhesion to various substrates, heat resistance, chemical resistance, electrical properties, and mechanical properties, compared to other resins, and thus is used in a wide range of industries. Epoxy resin is a prepolymer of a thermosetting resin, and reacts with a curing agent to produce a cured product of the epoxy resin, which has a three-dimensional network structure to exhibit unique properties of epoxy.

However, the cured product of the epoxy resin has low fracture toughness, and sometimes exhibit very brittle properties. As a way to solve this problem, nanoparticles as an additive are added to the epoxy resin. That is, tensile strength and lap shear strength may be improved by mixing the nanoparticles as an additive with the epoxy resin and curing the mixture. Furthermore, studies are being conducted to improve mechanical properties such as adhesion strength and impact resistance of the epoxy resin by introducing rubber or nano-inorganic particles to enhance the physical properties of the epoxy resin or by introducing based block copolymer-based organic nanoparticles to enhance the physical properties of the epoxy resin.

The Frank S. Bates' group at the University of Minnesota observed that when an epoxy monomer, a cross-linker, and a block copolymer react each other, alignment of the block copolymers in the epoxy occurs, and a form thereof is various. FIG. 1 is a TEM (Transmission Electron Microscopy) picture showing the block copolymer dispersed in the epoxy. As shown in FIG. 1, the alignment form of the block copolymers includes nanostructures such as vesicles (a), worm-like micelles (b), and spherical micelles (c). It has been reported that when the epoxy is subjected to impact, these nanostructures play a role in dispersing a stress, and thus, various mechanical properties may be enhanced. The group used a di-block copolymer of PEP-b-PEO (poly (ethylene propylene)-b-poly(ethylene oxide)) as the block copolymer.

Research of introducing the above various nanostructures as an additive is being conducted. The product development is being conducted via joint research with leading companies such as Dow, Dupont, and 3M.

Korean Patent No. 10-1893690 discloses, as an additive for an epoxy adhesive, a star-shaped molding polymer, wherein a polyacrylate halogenated at one end as an arm-polymer and a diacrylate compound or a dimethacrylate compound as a cross-linker are subjected to atom transfer radical polymerization (ATRP) to produce the star-shaped molding polymer, wherein the star-shaped molding polymer has a core/shell structure comprising a core formed via the polymerization of the cross-linker and a shell which a portion of the arm-polymer constitutes.

SUMMARY OF THE INVENTION

One purpose of the present disclosure is to provide an additive for an epoxy adhesive.

Another purpose of the present disclosure is to provide a composition for a structural epoxy adhesive comprising the additive for the epoxy adhesive.

A first aspect of the present disclosure provides an additive for an epoxy adhesive having a bottle brush structure, wherein the additive has a structure of a following Chemical Formula 1 including a core including a cyclic compound A and a shell connected to the core, wherein the cyclic compounds A are connected to each other via ROMP (Ring Opening Metathesis Polymerization):

[Chemical Formula 1]

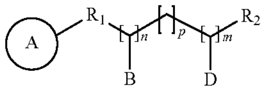

wherein in the Chemical Formula 1,

A represents a substituted or unsubstituted cycloalkene, each of $R_1$ and $R_2$ independently represents substituted or unsubstituted $C_1$ to $C_{10}$ alkyl, alkyne, nitroxide, ester, ether, amine, substituted or unsubstituted $C_5$ to $C_{12}$ carbon ring, substituted or unsubstituted $C_3$ to $C_{12}$ heterocyclic ring, or a combination thereof, each of B and D independently represents $C_2$ to $C_{10}$ alkyl acrylate, $C_2$ to $C_{10}$ alkyl methacrylate, acrylic acid, glycidyl acrylate, glycidyl methacrylate, or ethylene glycol, wherein a case in which all of B and D are $C_2$ to $C_{10}$ alkyl acrylate, or $C_2$ to $C_{10}$ alkyl methacrylate is excluded, wherein p is an integer of 0 or 1 to 10, and each of n and m independently is an integer of 1 to 100.

In the additive for the epoxy adhesive having the bottle brush structure, the cyclic compound A may be represented by one of following Chemical Formulas:

(1)

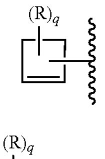

(2)

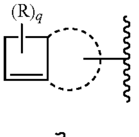

(3)

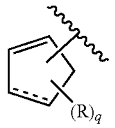

-continued (4)

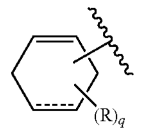

(5)

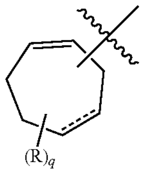

(6)

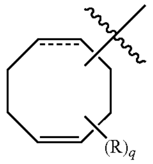

(7)

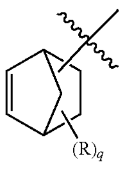

(8)

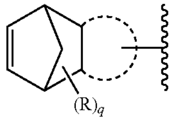

wherein in the above Chemical Formulas, R represents halogen, hydroxy, carboxy, amine, or alkyl, q is an integer from 0 or 1 to 6, a dotted line in each of the Chemical Formulas (2) and (8) represents substituted or unsubstituted carbon ring or heterocyclic ring, and

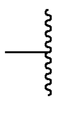

means being connected to $R_1$.

In the additive for the epoxy adhesive having the bottle brush structure, one of B and D may be $C_2$ to $C_{10}$ alkyl acrylate, and the other thereof may be glycidyl acrylate.

In the additive for the epoxy adhesive having the bottle brush structure, each of B and D may be acrylic acid.

In the additive for the epoxy adhesive having the bottle brush structure, the additive for the epoxy adhesive having the bottle brush structure may include a unit represented by one of following Chemical Formulas:

(10)

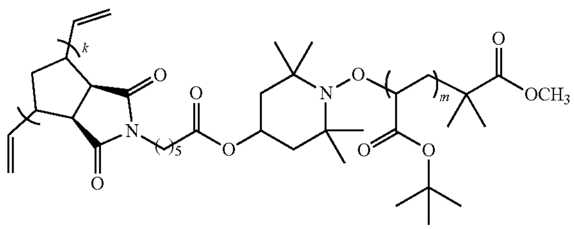

(20)

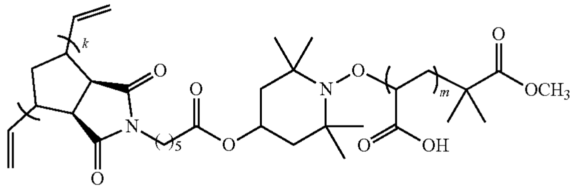

(30)

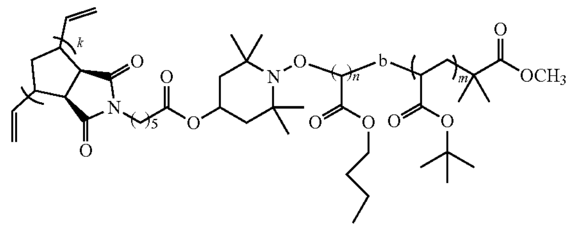

(40)

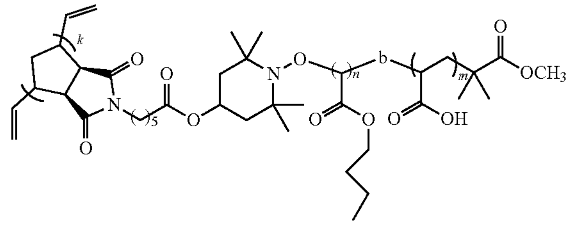

(50)

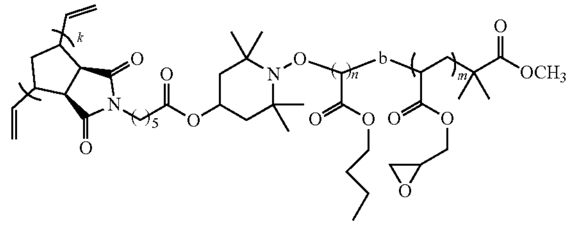

wherein in the above Chemical Formulas, k is an integer from 1 to 1000.

In the additive for the epoxy adhesive having the bottle brush structure, the additive may have a molecular weight in a range of 100 to 1,000K Da.

A second aspect of the present disclosure provides an additive for an epoxy adhesive having a bottle brush structure, wherein the additive includes a unit having a core and a shell, wherein a backbone of the additive is formed via polymerization of the cores, wherein the shell is connected to the backbone so as to constitute a side chain of the additive extending outwardly, wherein the side chain has an epoxyphilic functional group.

In the additive for the epoxy adhesive having the bottle brush structure of the second aspect, the side chain may include polyalkyl acrylate, polyalkyl methacrylate, polyacrylic acid, polyglycidyl acrylate, polyglycidyl methacrylate, or polyethylene glycol.

In the additive for the epoxy adhesive having the bottle brush structure of the second aspect, the core may include substituted or unsubstituted cycloalkene.

A third aspect of the present disclosure provides a composition for a structural epoxy adhesive, the composition comprising: the additive for the epoxy adhesive having the bottle brush structure according to one of the first and second aspects; and an epoxy resin.

The additive for the epoxy adhesive according to the aspects of the present disclosure has the bottle brush structure. Thus, chain entanglement between polymer chains thereof may be significantly lower than that of a linear copolymer, and thus may have low viscosity. Furthermore, a radius of gyration of the polymer chain thereof is small, such that surface wettability thereof may be excellent. Furthermore, the additive may improve a toughness of the epoxy without a significant change in a modulus or a glass transition temperature (Tg) of the epoxy.

The additive for the epoxy adhesive according to the aspects of the present disclosure may have properties controlled based on the functional group of the side chain. Specifically, when the side chain includes an epoxyphilic functional group, miscibility of the additive with the epoxy resin may be improved, such that dispersibility thereof may be improved, and chemical bonding thereof with the epoxy resin may be stably achieved. Accordingly, the adhesion strength of the epoxy adhesive may be further improved. Furthermore, when the side chain includes a functional group that serves as a buffer which absorbs external shocks, the mechanical properties of the epoxy adhesive may be improved.

The composition for the structural epoxy adhesive according to the aspect of the present disclosure has excellent mechanical strength, impact resistance, and high adhesion strength, and thus may be used in fields requiring high performance, such as automobile and aerospace industries.

DETAILED DESCRIPTION OF THE INVENTION

Figure 1:
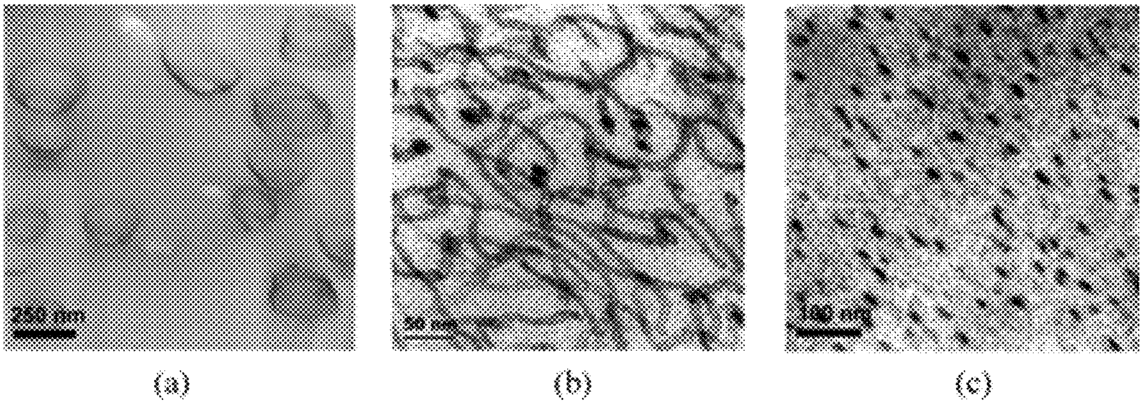
FIG. 1 is a TEM (Transmission Electron Microscopy) picture showing a block copolymer dispersed in an epoxy according to the prior art.

Hereinafter, an implementation and an embodiment of the present disclosure will be described in detail so that a person having ordinary knowledge in the technical field to which the present disclosure belongs may easily practice the same. However, the present disclosure may be implemented in many different forms and is not limited to the implementation and the embodiment as described herein.

The present disclosure may have various changes and may have various forms. Thus, specific embodiments are illustrated in drawings and described in detail herein. However, it should be appreciated that this is not intended to limit the present disclosure to the specific embodiments, and the present disclosure includes all changes, equivalents to substitutes included in the spirit and technical scope of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to an additive for an epoxy adhesive and an epoxy adhesive composition comprising the same.

The additive for the epoxy adhesive according to one embodiment of the present disclosure may be a bottle brush copolymer which includes a unit having a core and a shell, wherein a backbone thereof is formed via polymerization of the cores, and the shell is connected to the backbone so as to constitute a side chain extending outwardly.

As used herein, the additive for the epoxy adhesive may also be referred to as 'the additive' or 'the bottle brush copolymer'.

The additive for the epoxy adhesive according to the aspects of the present disclosure has the bottle brush structure. Thus, chain entanglement between polymer chains thereof may be significantly lower than that of a linear copolymer, and thus may have low viscosity. Furthermore, a radius of gyration of the polymer chain thereof is small, such that surface wettability thereof may be excellent. Furthermore, the additive may improve a toughness of the epoxy without a significant change in a modulus or a glass transition temperature (Tg) of the epoxy.

The additive for the epoxy adhesive according to the embodiment of the present disclosure may have properties controlled based on the functional group of the side chain. Specifically, when the side chain includes an epoxyphilic functional group, miscibility of the additive with the epoxy resin may be improved, such that dispersibility thereof may be improved, and chemical bonding thereof with the epoxy resin may be stably achieved. Accordingly, the adhesion strength of the epoxy adhesive may be further improved. Furthermore, when the side chain includes a functional group that serves as a buffer which absorbs external shocks, the mechanical properties of the epoxy adhesive may be improved.

Figure 2:
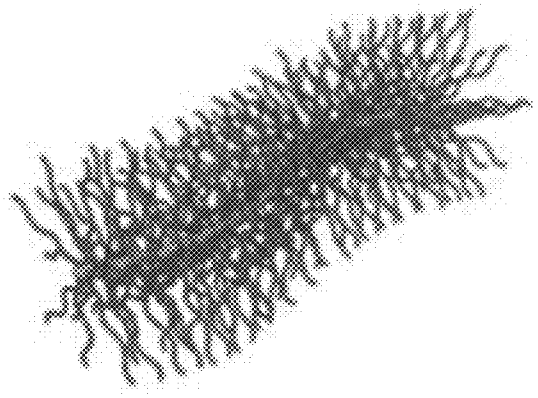
FIG. 2 is a schematic diagram schematically showing a bottle brush copolymer according to one embodiment of the present disclosure.

FIG. 2 is a schematic diagram schematically showing an additive for an epoxy adhesive according to one embodiment of the present disclosure.

Referring to FIG. 2, the additive for the epoxy adhesive according to one embodiment of the present disclosure may be a copolymer having a bottle brush structure as a whole, and may have the backbone, and a plurality of side chains connected to the backbone and extending outwardly.

According to one embodiment of the present disclosure, the bottle brush copolymer may be formed via polymerization of units, each unit having the core and the shell. The cores of the units are connected to each other via polymerization to form the backbone, and the shell may constitute the side chain. The core may include a cycloalkene, and the backbone may be formed via ROMP (Ring Opening Metathesis Polymerization) of the cycloalkenes, and the side chain may have an epoxyphilic functional group. Furthermore, according to an embodiment of the present disclosure, the side chain may include polyalkyl acrylate, polyacrylic acid, polyglycidyl acrylate, polyglycidyl methacrylate, or polyethylene glycol. According to one embodiment of the present disclosure, the unit having the core and the shell may be represented by a following Chemical Formula 1.

Another embodiment of the present disclosure provides an additive for an epoxy adhesive having a bottle brush structure, wherein the additive has a structure of a following Chemical Formula 1 including a core including a cyclic compound A and a shell connected to the core, wherein the cyclic compounds A are connected to each other via ROMP (Ring Opening Metathesis Polymerization):

[Chemical Formula 1]

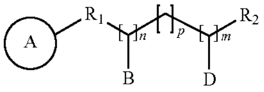

wherein in the Chemical Formula 1,

A represents a substituted or unsubstituted cycloalkene, each of $R_1$ and $R_2$ independently represents substituted or unsubstituted $C_1$ to $C_{10}$ alkyl, alkyne, nitroxide, ester, ether, amine, substituted or unsubstituted $C_5$ to $C_{12}$ carbon ring, substituted or unsubstituted $C_3$ to $C_{12}$ heterocyclic ring, or a combination thereof, each of B and D independently represents $C_2$ to $C_{10}$ alkyl acrylate, $C_2$ to $C_{10}$ alkyl methacrylate, acrylic acid, glycidyl acrylate, glycidyl methacrylate, or ethylene glycol, wherein a case in which all of B and D are $C_2$ to $C_{10}$ alkyl acrylate, or $C_2$ to $C_{10}$ alkyl methacrylate is excluded, wherein p is an integer of 0 or 1 to 10, and each of n and m independently is an integer of 1 to 100.

According to one embodiment of the present disclosure, the backbone of the bottle brush copolymer may be formed via ROMP (Ring Opening Metathesis Polymerization) of the cyclic compounds A. According to one embodiment of the present disclosure, the cyclic compound A may be a substituted or unsubstituted cycloalkene. The cyclic compound A is not particularly limited as long as it is a compound capable of ROMP (Ring Opening Metathesis Polymerization). For example, the cyclic compound A may be represented by one of following Chemical Formulas:

(1)

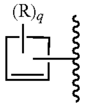

(2)

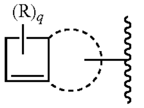

(3)

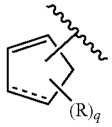

(4)

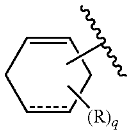

(5)

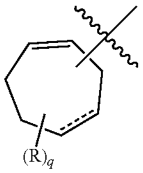

(6)

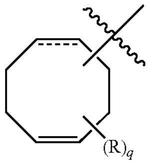

(7)

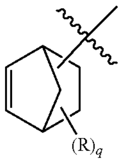

(8)

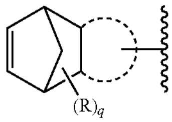

wherein in the above Chemical Formulas,

R represents halogen, hydroxy, carboxy, amine, or alkyl, q is an integer from 0 or 1 to 6.

Further, a dotted line in each of the Chemical Formulas (2) and (8) represents substituted or unsubstituted carbon ring or heterocyclic ring. Although not shown above, each of the following Chemical Formula (3) to (6) may have the carbon ring or heterocyclic ring indicated by the dotted line as in the Chemical Formulas (2) and (8). Furthermore, the cycloalkene may contain one or more double bonds. Further,

means being connected to $R_1$.

When the cycloalkene has a substituent R or the ring indicated by the dotted line in Chemical Formulas (2) and (8), the ROMP may be performed more effectively due to steric hinderance.

The Chemical Formula (2) and the Chemical Formula (8) may include following Chemical Formulas. However, the present disclosure is not limited thereto.

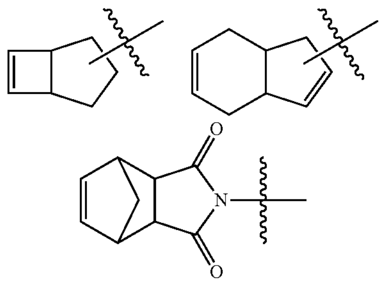

The backbone formation via the ROMP (Ring Opening Metathesis Polymerization) of the cyclic compounds A may be expressed based on a following reaction formula. In the following reaction formula, the substituent R of the cyclic compound A and the ring as indicated by the dotted line in the Chemical Formulas (2) and (8) are omitted.

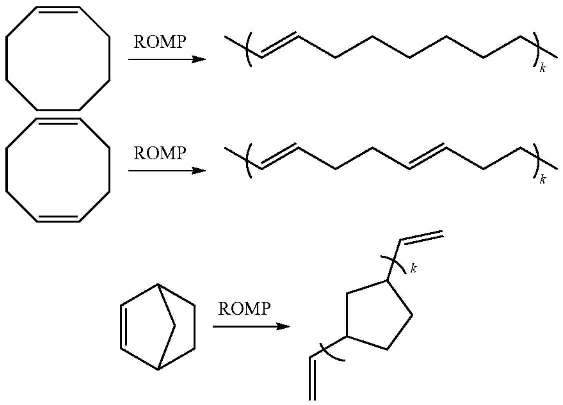

Each of $R_1$ and $R_2$ may independently represent substituted or unsubstituted $C_1$ to $C_{10}$ alkyl, alkyne, nitroxide, ester, ether, amine, substituted or unsubstituted $C_5$ to $C_{12}$ carbon ring, substituted or unsubstituted $C_3$ to $C_{12}$ heterocyclic ring, or a combination thereof.

Each of $R_1$ and $R_2$ may act as a linking group or a terminal group and may be variously selected from the viewpoint of easiness of synthesis of the bottle brush copolymer.

According to one embodiment of the present disclosure, the cyclic compound A and the chain including $R_1$ and/or $R_2$ may bind to each other via radical polymerization, and accordingly, each of $R_1$ and $R_2$ may be appropriately selected.

In one example, $R_1$ may include $-(CH_2)_5COO-$, 2,2,6,6-tetramethylpiperidine-N-oxyl, TEMPO, etc.

Each of B and D may independently represent $C_2$ to $C_{10}$ alkyl acrylate, $C_2$ to $C_{10}$ alkyl methacrylate, acrylic acid, glycidyl acrylate, glycidyl methacrylate, or ethylene glycol. Each of n and m independently is an integer from 1 to 100.

When each of n and m is out of the above range, it may be difficult to form the bottle brush structure.

The carbon chain represented by p may serve as a bridge connecting B and D to each other, wherein p may be an integer of 0 or 1 to 10.

According to one embodiment of the present disclosure, each of B and D may constitute the side chain of the bottle brush copolymer, and may be coupled to the backbone and may extend outwardly. Thus, the bottle brush shape may be formed. A spacing may be formed between the side chains so as to exhibit fluidity. The fluidity may be controlled via change in a chemical structure of the shell, and thus, various properties may be realized.

According to one embodiment of the present disclosure, B or D may be a $C_2$ to $C_{10}$ alkyl acrylate or a $C_2$ to $C_{10}$ alkyl methacrylate. In one example, $C_2$ to $C_{10}$ alkyl (meth)acrylate may include, for example, ethyl (meth)acrylate, propyl (meth)acrylate, butyl (meth)acrylate, tertbutyl (meth)acrylate, pentyl (meth)acrylate, hexyl (meth)acrylate, ethylhexyl (meth)acrylate, and the like. The present disclosure is not limited thereto.

The polyalkyl (meth)acrylate block may have rubbery properties, and thus, may efficiently absorb and disperse an externally applied impact. Accordingly, the bottle brush copolymer according to one embodiment of the present disclosure may have cavitation and crack bridging effects, and may serve as an effective buffer to improve mechanical properties of the epoxy adhesive. Furthermore, this shock absorption effect may increase the cohesion of the epoxy matrix to improve the adhesion of the epoxy adhesive.

Furthermore, according to an embodiment of the present disclosure, each of B and D may have an epoxyphilic functional group. The side chain may include the epoxyphilic functional group, such that miscibility of the additive with the epoxy resin is improved. Thus, the bottle brush copolymer may have excellent dispersibility. In one example, each of B and D may be acrylic acid, glycidyl acrylate, glycidyl methacrylate, or ethylene glycol. However, the present disclosure is not limited thereto.

According to one embodiment of the present disclosure, one of B and D may be a $C_2$ to $C_{10}$ alkyl acrylate, specifically, butyl acrylate, and the other thereof may be glycidyl acrylate. The polybutyl acrylate block has rubber properties and may play a role of absorbing and dispersing the externally applied shock. The poly glycidyl acrylate block may have excellent miscibility with epoxy and thus may improve the dispersibility of the bottle brush copolymer. Further, the glycidyl group participates in the curing reaction of the epoxy resin to form a stable chemical bond with the epoxy resin.

According to one embodiment of the present disclosure, the bottle brush copolymer may be a random copolymer or a block copolymer.

According to one embodiment of the present disclosure, a polymerization ratio of the polyalkyl acrylate block and the polyglycidyl acrylate block may be in a range of 9:1 to 7:3. When the polymerization ratio is in the above range, dispersibility and shock absorption effects may exert synergistic effects.

Furthermore, according to one embodiment of the present disclosure, each of B and/or D may be acrylic acid. The carboxylic acid group of the polyacrylic acid block forms a hydrogen bond with an adhesive member to improve the adhesive strength of the epoxy adhesive.

The additive for an epoxy adhesive having the bottle brush structure according to an embodiment of the present disclosure may include the unit represented by one of following Chemical Formulas:

(10)

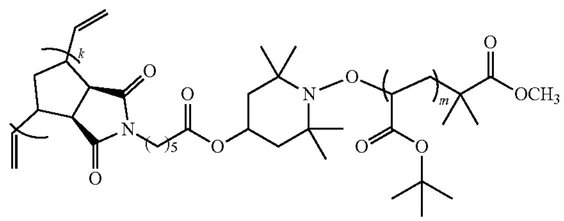

(20)

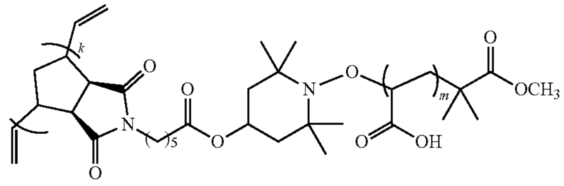

(30)

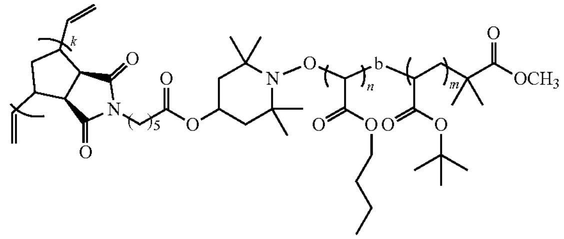

(40)

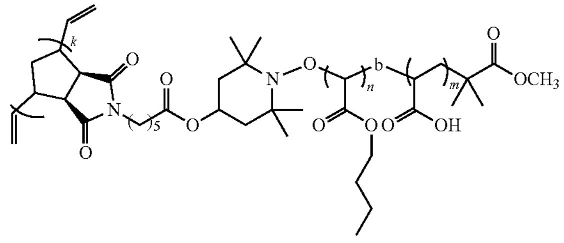

(50)

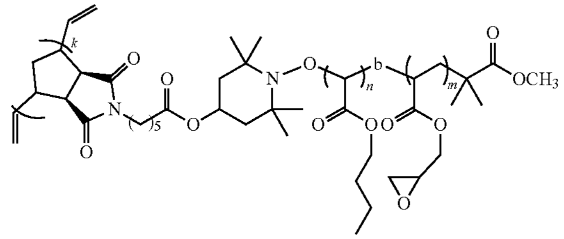

wherein in the above Chemical Formulas, k is an integer from 1 to 1000.

The molecular weight of the bottle brush copolymer according to one embodiment of the present disclosure may be in a range of 100 to 1,000K Da, specifically, 100 to 700K Da, or 100 to 400K Da. When the molecular weight of the bottle brush copolymer is smaller than 100K Da, the toughness enhancement effect due to the rubber properties may not be sufficient. When the molecular weight of the bottle brush copolymer according to one embodiment of the present disclosure exceeds 1,000K Da, the dispersibility thereof may decrease due to the tendency that the additives aggregate with each other.

Furthermore, a grafting density of the bottle brush copolymer may be in a range of 80 to 100%. When the grafting density is out of the above range, it may be difficult for the bottle brush copolymer to behave as a single micelle in the epoxy matrix.

A method for preparing the additive for the epoxy adhesive according to one embodiment of the present disclosure is not particularly limited. Rather, the additive for the epoxy adhesive according to one embodiment of the present disclosure may be synthesized using a method commonly used in the art. The additive for the epoxy adhesive according to one embodiment of the present disclosure may be synthesized using, for example, a Grafting-From, Grafting-Through, or Grafting-To method. However, the present disclosure is not limited thereto. Grafting-From is a method of synthesizing the backbone first and then polymerizing the side chains. Grafting-Through is a method in which large monomers are first synthesized and then the large monomers are connected to each other via ROMP (ring opening metathesis polymerization) to form a main chain. Grafting-To is a method for obtaining high grafting density while overcoming steric interaction.

According to this embodiment, first, a side chain may be synthesized via ATRP (Atom Transfer Radical Polymerization). Then, a macromonomer may be synthesized by binding the side chain and a cycloalkene compound to each other via a radical coupling reaction. Then, the bottle brush copolymer may be synthesized by opening the ring of the cycloalkene via the ROMP to synthesize the backbone.

Another embodiment of the present disclosure relates to a composition for a structural epoxy adhesive.

The composition for the structural epoxy adhesive according to one embodiment of the present disclosure may include an epoxy resin and the additive for the epoxy adhesive. The additive for the epoxy adhesive (hereinafter referred to as 'additive') may be a bottle brush copolymer according to an embodiment of the present disclosure, wherein specific characteristics thereof are as described above.

In the present disclosure, the structural epoxy adhesive may be defined as a material whose adhesive strength exceeds 6.9 MPa (1,000 psi) at room temperature and which is capable of bonding high-strength materials such as wood, composites or metals to each other.

The structural epoxy adhesive is used in fields requiring high performance, such as the automobile and aerospace industries. The composition for the structural epoxy adhesive according to one embodiment of the present disclosure has excellent mechanical strength, impact resistance and high adhesion strength, and thus may be widely used in the corresponding fields.

According to one embodiment of the present disclosure, a liquid epoxy resin may be used as the epoxy resin, and may include a bisphenol-A based epoxy resin. Additionally, the epoxy resin may further include a chelate-substituted functional epoxy resin and/or a reactive diluent together with the bisphenol-A based epoxy resin. The functional epoxy resin may also be in a liquid form.

The additive for the epoxy adhesive may be mixed with the epoxy resin in a content of 0.5 to 60 parts by weight based on 100 parts by weight of the epoxy resin. When the content is smaller than 0.5 parts by weight, the effect of absorbing the shock and improving the adhesion is not exhibited. When the content exceeds 60 parts by weight, the adhesive strength may rather decrease.

According to one embodiment of the present disclosure, the epoxy adhesive composition may further include an epoxy curing agent, rubber particles, a modified urethane resin, and a modified epoxy resin.

The epoxy curing agent may be a curing agent capable of thermally curing the epoxy resin at medium and high temperatures. The epoxy curing agent may include a curing agent capable of thermally curing the epoxy resin at a temperature of at least 100° C. or higher. For example, dicyan diamide may be used as the epoxy curing agent.

The rubber particles may be acrylic rubber particles, and a size of each of the rubber particles may be different from the size of the additive. Overall adhesion strength and impact resistance may be further improved by using the rubber particles having sizes different from that of the additive.

The modified urethane resin may be mixed with the epoxy resin to soften a medium of the epoxy resin while improving adhesion strength. The modified urethane resin may include liquid polyurethane having a phenol functionalized end.

The modified epoxy resin itself means a flexible epoxy resin and is a component that assists the function of the modified urethane resin.

Furthermore, the composition for the structural epoxy adhesive according to one embodiment of the present disclosure may further include a filler, an adhesion promoter, and/or catalyst. The filler may function as an adhesion promoter. For example, metal oxide particles may be used as the filler. Furthermore, an epoxy functionalized silane compound may be used as a separate adhesion promoter, and imidazole may be used as the catalyst.

The composition for the structural epoxy adhesive according to one embodiment of the present disclosure may include 30 to 70 wt % of the epoxy resin, 1 to 45 wt % of the additive, 2 to 15 wt % of the rubber particles, 10 to 50 wt % of the modified urethane resin, 10 wt % to 50% by weight of the modified epoxy resin, 0.1 to 1% by weight of the adhesion promoter, 1 to 10% by weight of the filler, 1 to 10% by weight of the curing agent, and 0.1 to 1% by weight of the catalyst.

The structural epoxy adhesive according to one embodiment of the present disclosure may be prepared by mixing the additive for the epoxy adhesive having the bottle brush structure according to one embodiment of the present disclosure as described above, the epoxy resin, the epoxy curing agent, catalyst, etc., with each other to prepare a mixture and applying heat the mixture at 100° C. to 180° C. to cure the mixture. In this regard, in the process of preparing the mixture, the additive in a solution state in the additive is dissolved in the organic solvent is mixed with the liquid epoxy resin. Thus, the heating process may be performed at 100° C. to 150° C. in a vacuum condition to remove the organic solvent in a state in which the epoxy resin is not mixed with the epoxy curing agent. In a state in which, as described above, the organic solvent is removed from the epoxy resin, and a molding polymer is mixed with the liquid epoxy resin, an additive such as the epoxy curing agent and the catalyst is mixed therewith, and then the mixture is cured by heat to produce an adhesive.

The structural epoxy adhesive according to one embodiment of the present disclosure may be interposed between two substrates and then heat may be applied thereto, thereby firmly bonding the two substrates to each other without a separate member. In this case, the two substrates may be made of different materials or may be made of the same material. In particular, the substrates may be made of metal.

As described above, the copolymer of the bottle brush structure added to the composition for the structural epoxy adhesive according to one embodiment of the present disclosure has excellent miscibility with the epoxy resin and excellent dispersibility therein, and has a shock absorbing effect, thereby improving the mechanical properties and the adhesion strength of the epoxy adhesive. Therefore, the composition for the structural epoxy adhesive according to one embodiment of the present disclosure may be widely used in fields requiring high adhesion and impact resistance, such as automobile or aerospace industries.

Hereinafter, the present disclosure will be described in more detail through Examples according to an embodiment of the present disclosure. Following Examples are not intended to limit the scope of the present disclosure.

EXAMPLES

Preparation Example

A bottle brush copolymer was synthesized via the Grafting-From method as follows.

1) Step 1: Synthesis of Cycloalkene (NB-Functionalized Nitroxide Radical) Compound

[Reaction Formula 1]

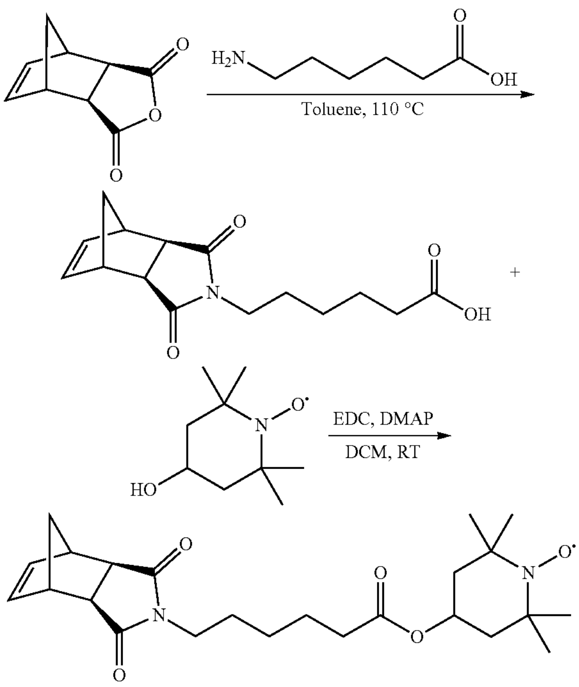

cis-5-norbornene-exo-2,3-dicarboxylic anhydride and 6-aminohexanoic acid were dissolved in dry toluene at a 1:1 eq ratio to produce a mixed solution. Thereafter, a reflux condenser was connected thereto and was sealed with a rubber septum, and argon purging was performed for 30 minutes. After purging was completed, triethylamine (0.2 eq) was added dropwise thereto at room temperature, and stirring was performed thereon for 3 days. After the reaction was completed, a crude product was diluted with DCM and then washed with 0.1N concentration HCl solution, deionized water, and brine. The resulting product was subjected to purification, and then the organic layer was dehydrated with anhydrous $MgSO_4$, and the solvent was removed therefrom with an evaporator, and the resulting produced was dried in a vacuum oven.

The synthesized norbornene along with EDC and DMAP catalysts were dissolved in dry DCM, and argon purging was performed thereon. Furthermore, a solution was prepared by dissolving N-TEMPO in dry DCM, and then was added drop by drop to the norbornene solution subjected to the purging while stirring thereof at room temperature. The reaction was carried out overnight at room temperature. After the reaction was completed, the reaction product was washed with deionized water and brine, and then was dehydrated with anhydrous $MgSO_4$. Then, the solvent was removed therefrom, and the crude product was purified through a silica column. A 3/1 EtOAc/cyclohexane solution flowed down along the column. After the purification, the product was dried in a vacuum oven to obtain a pure product.

Figure 3:
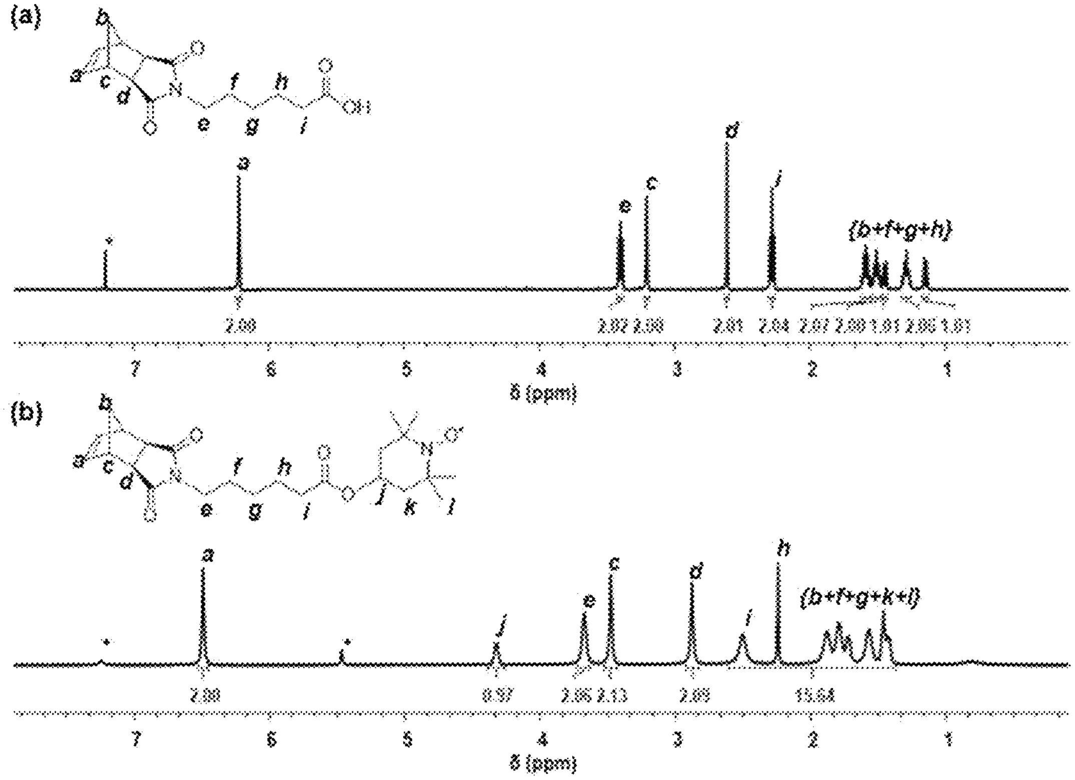
FIG. 3 to FIG. 5 are $^1$H NMR of compounds synthesized according to an embodiment of the present disclosure.

FIG. 3 is the $^1$H NMR result of a target compound in each step. Thus, it was identified based on the result that the target compound was synthesized in each step.

2) Second Step: NB-Polymer Synthesis

First, via ATRP, following four types of linear polymers, that is, poly butyl acrylate (PBA), poly tert butyl acrylate (PtBA), poly butyl acrylate-b-poly glycidyl methacrylate (PBA-b-PGMA), and poly butyl acrylate-b-poly tert butyl acrylate (PBA-b-PtBA) were synthesized.

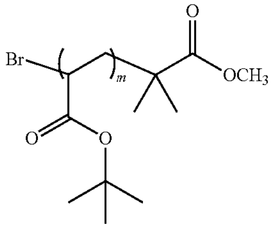

PtBA

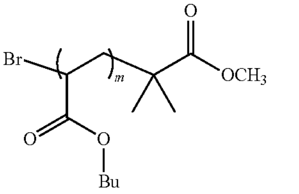

PBA

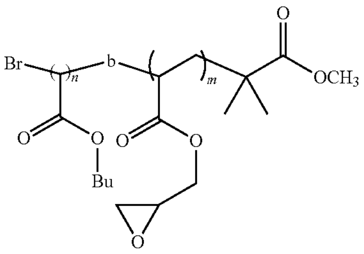

PBA-b-PGMA

-continued

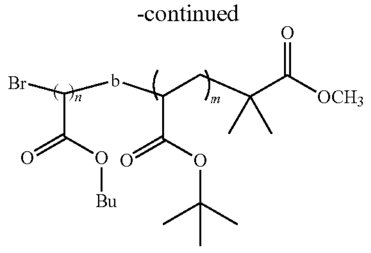

PBA-b-PtBA

Next, as in following Synthesis Present Examples 1 to 4, the above four linear polymers and the nitroxide radical (NB-functionalized nitroxide radical) synthesized in the first step were dissolved in a dry toluene/DMSO (1:1) solution at 1:1 eq in an argon chamber to prepare a mixed solution. Then, copper bromide and Me6TREN catalyst were added thereto, followed by stifling. The reaction proceeded for about 3 hours, and after the reaction, the reaction product was taken out of the argon chamber. Then, the copper catalyst was removed therefrom through an alumina column. Then, the solvent was entirely removed from the purified solution with an evaporator. The precipitates were collected in methanol, methanol/water, or diethyl ether two or three times. Then, all unreacted substances and by-products were removed.

Synthesis Example 1: NB-g-PtBA

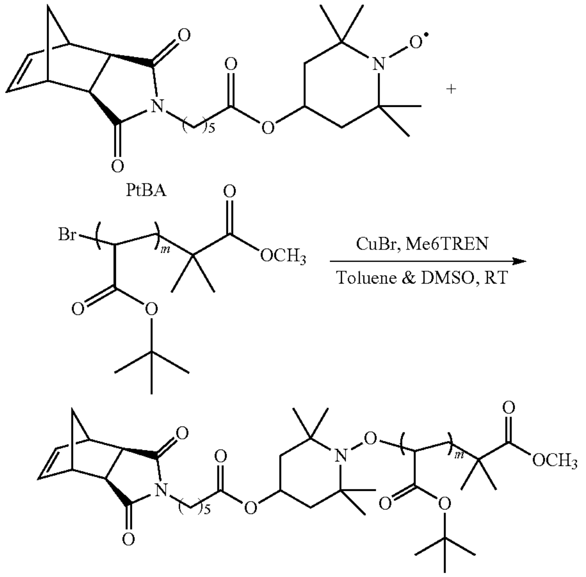

Synthesis Example 2: NB-g-PBA

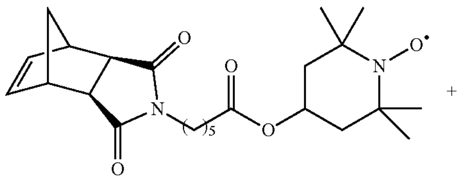

-continued

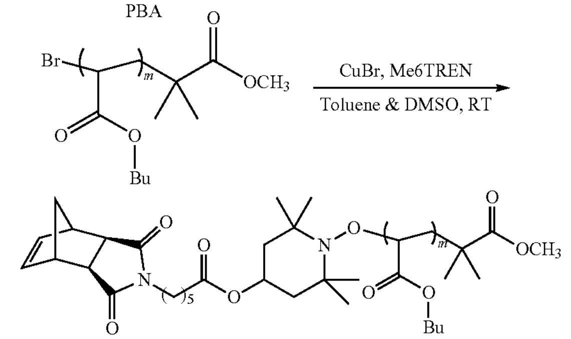

Synthesis Example 3: NB-g-PBA-PGMA

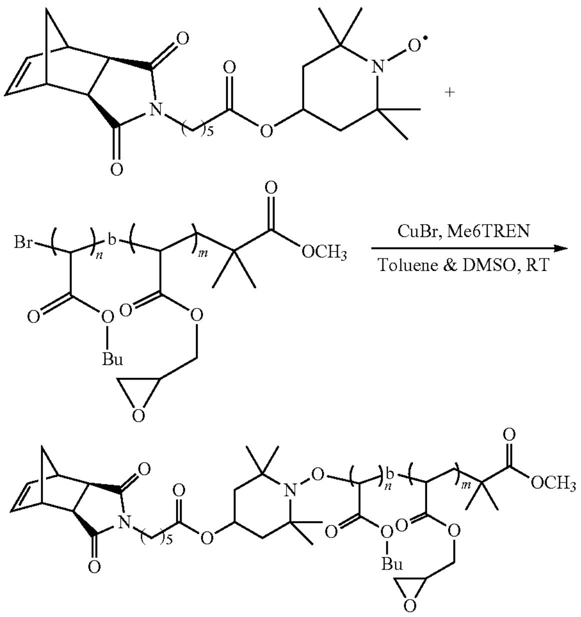

Synthesis Example 4: NB-g-PBA-PtBA

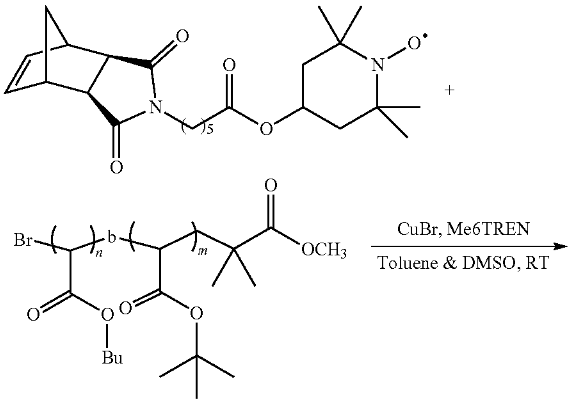

-continued

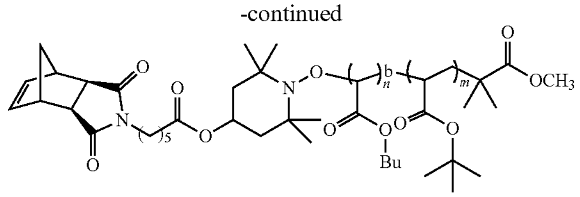

In order to identify whether the radical coupling reaction was carried out well, $^{1}H$ NMR was measured. The result is shown in FIG. 4.

Figure 4:
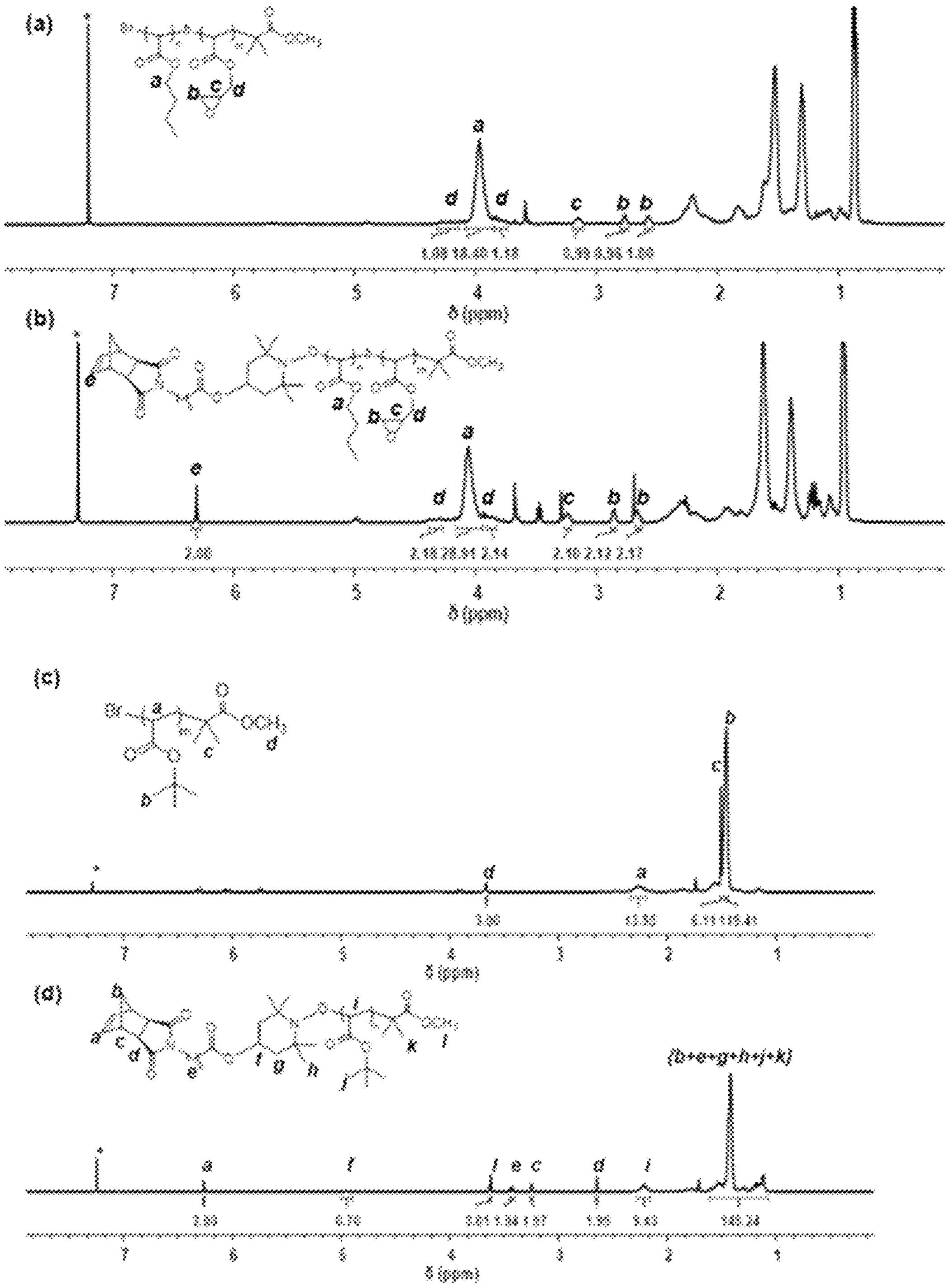

Referring to (a) in FIG. 4, it was identified that PBA-b-PGMA was well synthesized via ATRP. It may be identified that the ratio of PBA and PGMA is about 9:1, and PBA-b-PGMA is a block copolymer with 10% PGMA. When each of b, c, and d peaks is set to 1, each of b, c, and d peaks exactly has one proton, while a peak having two protons has an integral value of 18. Thus, it was identified that the ratio of the PBA and PGMA was 9:1. Referring to (b) in FIG. 4, it is identified that after the radical coupling of Norbornene and PBA-b-PGMA, the ratio of each of the remaining picks does not change, and the norbornene peak e exactly has two protons. Furthermore, referring to (c) and (d) in FIG. 4, it was identified that each of PtBA and NB-g-PtBA was synthesized well.

3) Step 3: Synthesis of Bottle Brush Copolymer

As shown in following Synthesis Example 5 to 8, the Norbonene chain was opened via ROMP to form a backbone to synthesize a bottle brush (BB) copolymer.

Synthesis Example 5: BB-g-PBA

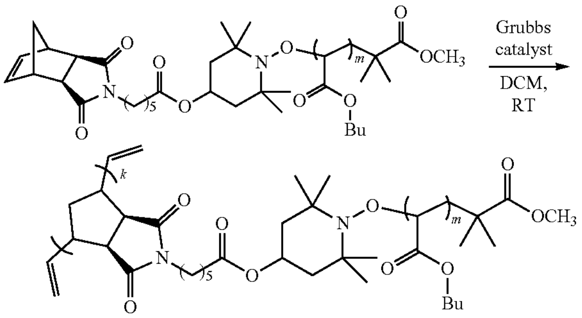

Synthesis Example 6: BB-g-PtBA

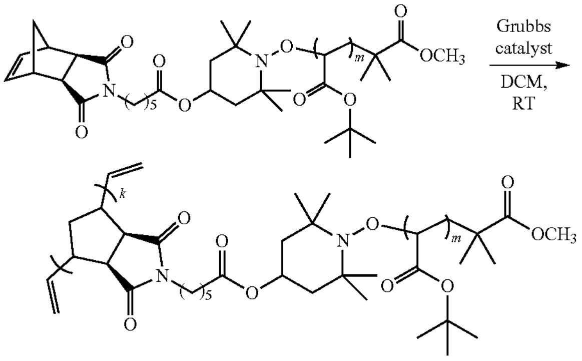

Synthesis Example 6-1: BB-g-PAA
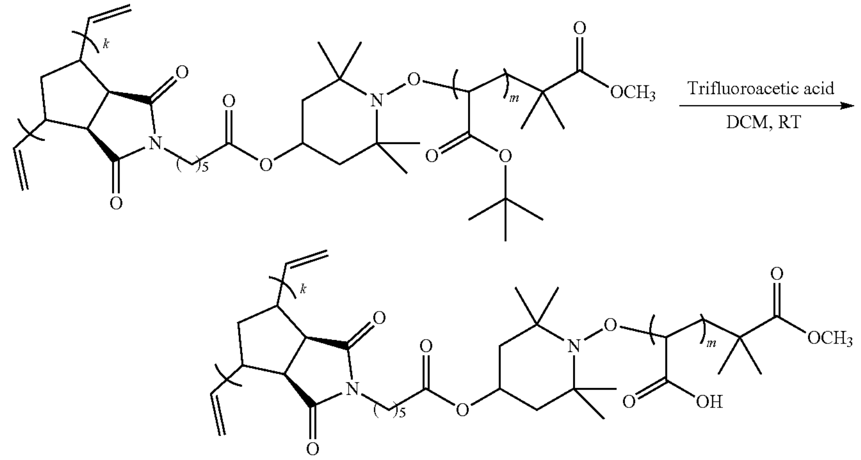
Synthesis Example 7: BB-g-(PBA-b-PGMA)
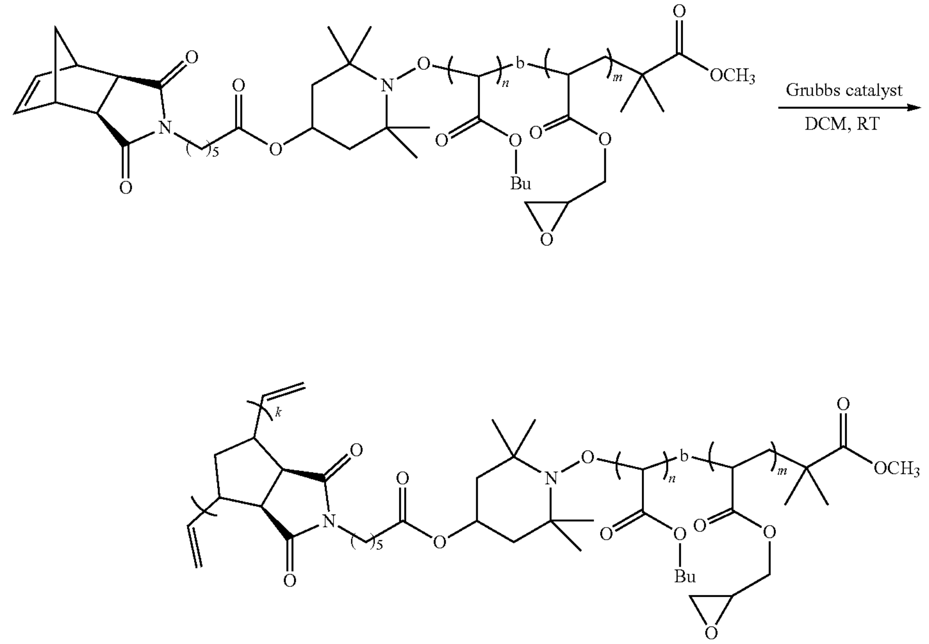
Synthesis Example 8: BB-g-(PBA-b-PtBA)
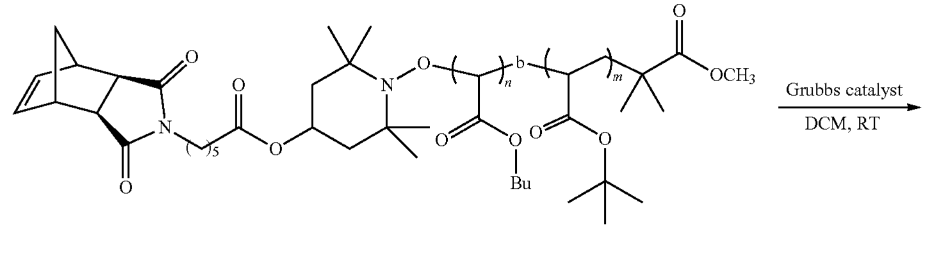

-continued

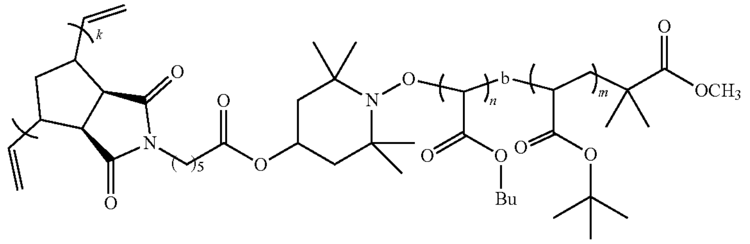

Synthesis Example 8-1: BB-g-(PBA-b-PAA)

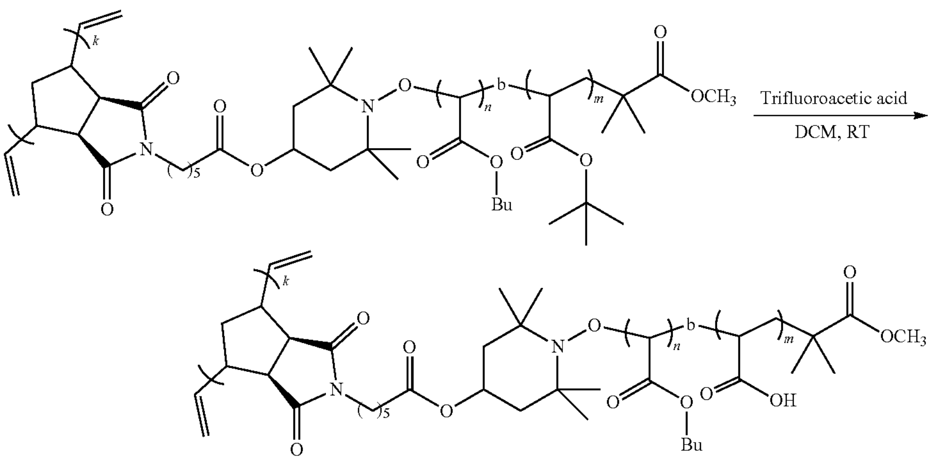

Figure 5:
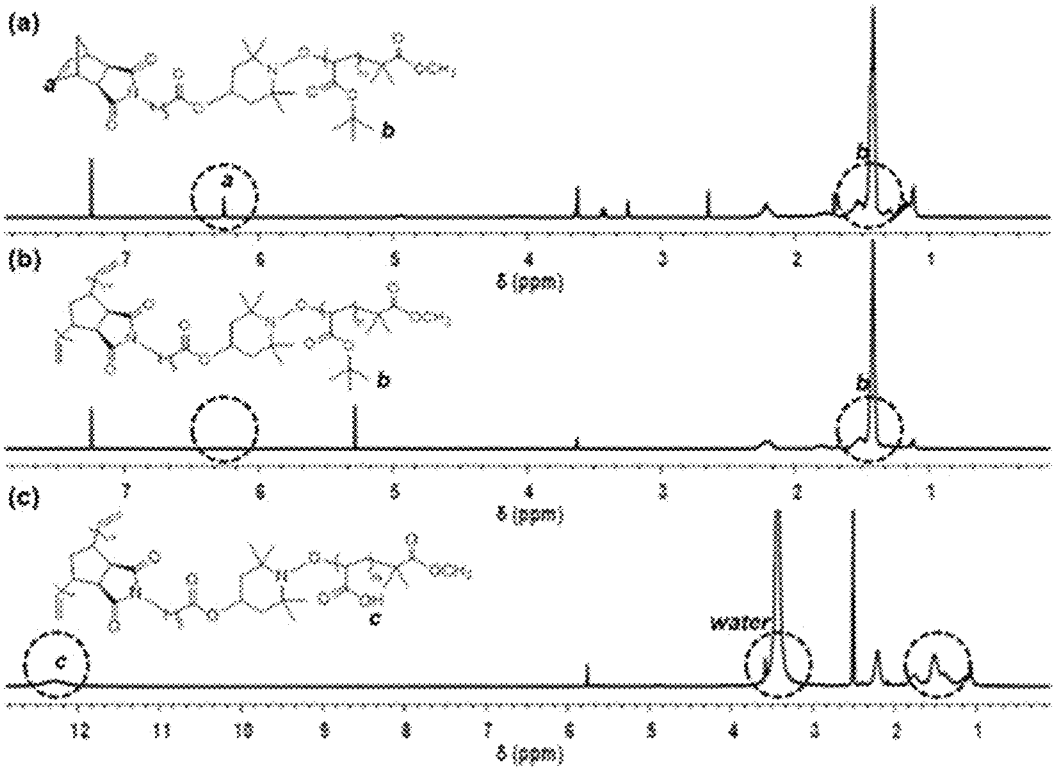

Specifically, the NB-polymer prepared in the second step was dissolved in distilled THF to produce a solution, which in turn was completely degassed b performing freeze pump thereof thaw three times. Then, the ROMP reaction was performed in an argon chamber using a Grubbs tertiary catalyst. After the reaction, the ROMP reaction was terminated with ethyl vinyl ether, the solvent was blown off, and the precipitates were collected and dried in a vacuum oven. The degree of polymerization (DP) of the main chain was controlled based on the ratio of Grubbs tertiary catalyst and the NB-polymer. In the case of Synthesis Example 6 and Synthesis Example 8, a deprotection process was additionally performed to synthesize BB-g-PAA (Synthesis Example 6-1) and BB-g-(PBA-b-PAA) (Synthesis Example 8-1). The degree of polymerization of the backbone was adjusted to 100, 200, and 300 for synthesis. In order to identify whether the compound was synthesized, $^1$H NMR was measured. The result is shown in FIG. 5. Referring to FIG. 5, it was identified that the Norbonene chain was opened via ROMP such that the backbone was synthesized.

Measurement of Molecular Weight and Conversion Percentage

The molecular weight and the conversion percentage of each of compounds synthesized in the above preparation examples were measured using MALS (Multi angle light scattering) equipment. It was identified that each of NB-g-PBA, NB-g-PtBA, NB-g-(PBA-b-PGMA), All of NB-g-(PBA-b-PtBA) had the conversion percentage of 95% or higher. The do/dc value of the bottle brush copolymer (BB) was directly measured using a RI (Refractive Index detector), and the result is shown in Table 1 below.

TABLE 1

| | | Mn(Side Chain) | Mn(co-polymer) | dn/dc |
|---|---|---|---|---|
| Synthesis Example 1 | NB-g-PtBA | 1K | 1K | 0.045~0.052 |
| Synthesis Example 6 | BB-g-PtBA | 3K | 170K | 0.065 |
| | BB-g-PtBA | 1K | 100K | 0.065 |
| | BB-g-PtBA | 1K | 700K | 0.065 |
| | BB-g-PtBA | 4K | 400K | 0.055 |
| Synthesis Example 7 | BB-g-PBA-b-PGMA | 4K(8:2) | 400K | 0.052 |
| | BB-g-PBA-b-PGMA | 4K(9:1) | 400K | 0.052 |

Figure 6:
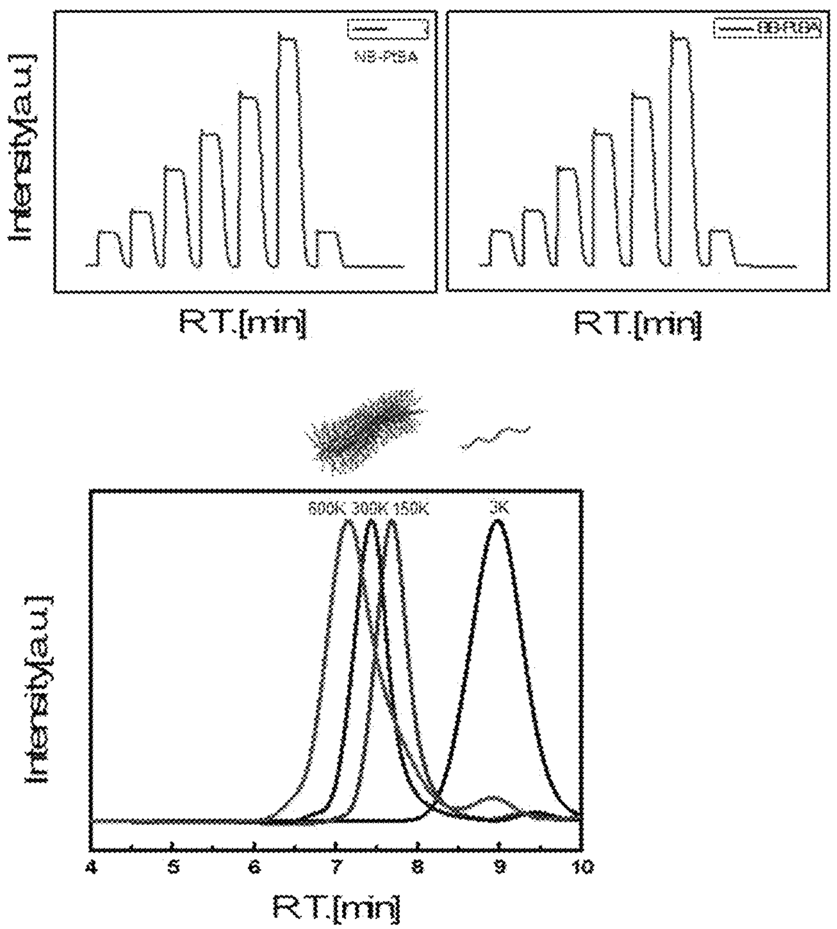
FIG. 6 is a GPC graph of compounds synthesized according to an embodiment of the present disclosure.

FIG. 6 is a GPC (Gel Permeation Chromatography) graph of the compound synthesized in the preparation example. In FIG. 6, 3K is the GPC graph of NB-PtBA (molecular weight 3K), 150K is the GPC graph of BB-g-PtBA (molecular weight 150K), 300K is the GPC graph of BB-g-PtBA (molecular weight 300K), and 600K is a GPC graph of BB-g-PtBA (molecular weight 600K). Referring to FIG. 6, it was identified that a well-defined bottle brush copolymer was synthesized.

Glass Transition Temperature Measurement

Figure 7:
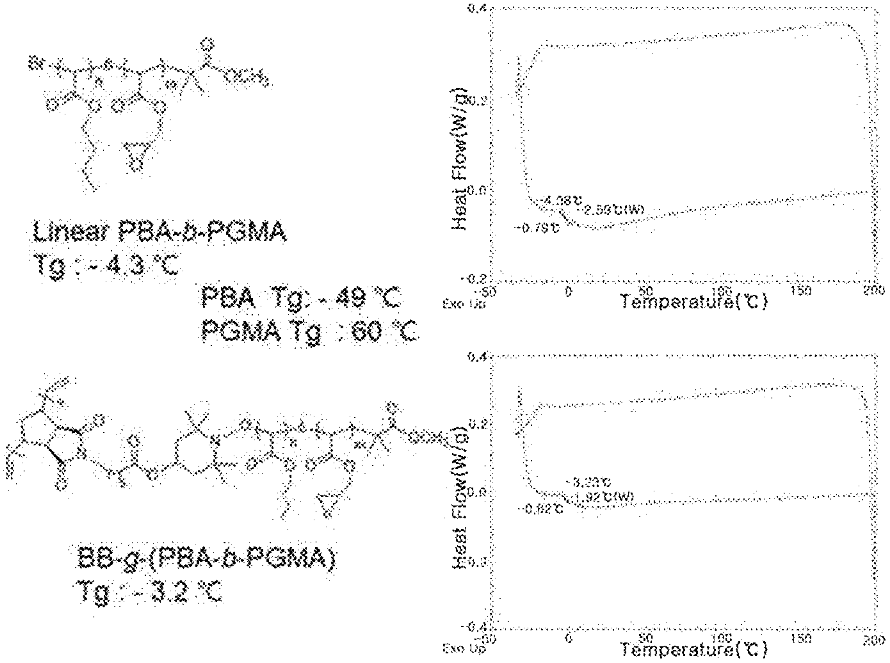
FIG. 7 is a DSC measurement result of compounds synthesized according to an embodiment of the present disclosure.

The glass transition temperature was measured using DSC to see if the bottle brush copolymer had rubber properties like the linear copolymer despite the structural change thereof. The measurement result is shown in FIG. 7. Referring to FIG. 7, it may be identified that the glass transition temperature (Tg) of the linear polymer PBA-b-PGMA is −4.3° C., and that of BB-g-(PBA-b-PGMA) is −3.2° C., and thus, the glass transition temperature of the BB-g-(PBA-b-PGMA) does not change significantly compared to that of the linear polymer.

Adhesion Evaluation of Epoxy Adhesive

Epoxy adhesive samples were prepared using the epoxy resin (Epon 828), the curing agent (Jeffamine D230), and the linear polymer and the bottle brush copolymer prepared in the above Synthesis Example as the additive. Then, the adhesion test was conducted thereon according to the ASTM-D1002 standard. At this time, an adhesive coating thickness was 0.08 mm±0.02. The samples were prepared by varying the type, the molecular weight, and the contents of the linear polymer and the bottle brush copolymer, and the test results are shown in Tables 2 to 5 and FIGS. 8.

TABLE 2

| Lap shear strength | Neat | Comparative Example 1 PBA(molecular weight 4K) | Comparative Example 2 PAA(molecular weight 3K) | Comparative Example 3 PBA-b-PGMA (molecular weight 4K_9:1) |
|---|---|---|---|---|
| kgf | 276 | 123 | 363(130%) | 157 |
| $kgf/cm^2$ | 85.6 | 38.1 | 112(130%) | 48.5 |
| MPa | 8.39 | 3.73 | 11.0(130%) | 4.76 |

TABLE 3

| | Neat | Comparative Example 4 BB-g-PBA(4K-400K) | Present Example 1 BB-g-PAA(3K-170K) | Present Example 2 BB-g-PAA(1K-100K) | Present Example 3 BB-g-(PBA-b-PGMA)(4K-400K_9:1) |
|---|---|---|---|---|---|
| kgf | 276 | 223 | 497(180%) | 485(160%) | 554(200%) |
| $kgf/cm^2$ | 85.6 | 69 | 1504(180%) | 150(160%) | 172(200%) |
| MPa | 8.39 | 6.76 | 15.1(180%) | 14.7(160%) | 16.8(200%) |

Referring to Tables 2 and 3 above, it may be identified that adhesion strength is improved when the bottle brush copolymer according to one embodiment of the present disclosure is used as the additive. Specifically, it may be identified that in Present Example 1 to Present Example 3, the bottle brush copolymer includes PAA or PBA-b-PGMA block, and thus the adhesive strength thereof is improved by 160 to 200% compared to the sample free of the additive. In the Comparative Example 2, the adhesive strength was improved, but the improvement effect was not significant compared to the Present Examples. Furthermore, it was identified that in the case of Comparative Example 4, the bottle brush copolymer was used as an additive, but only the PBA block was included therein, the adhesion strength thereof was rather deteriorated.

Figure 8:
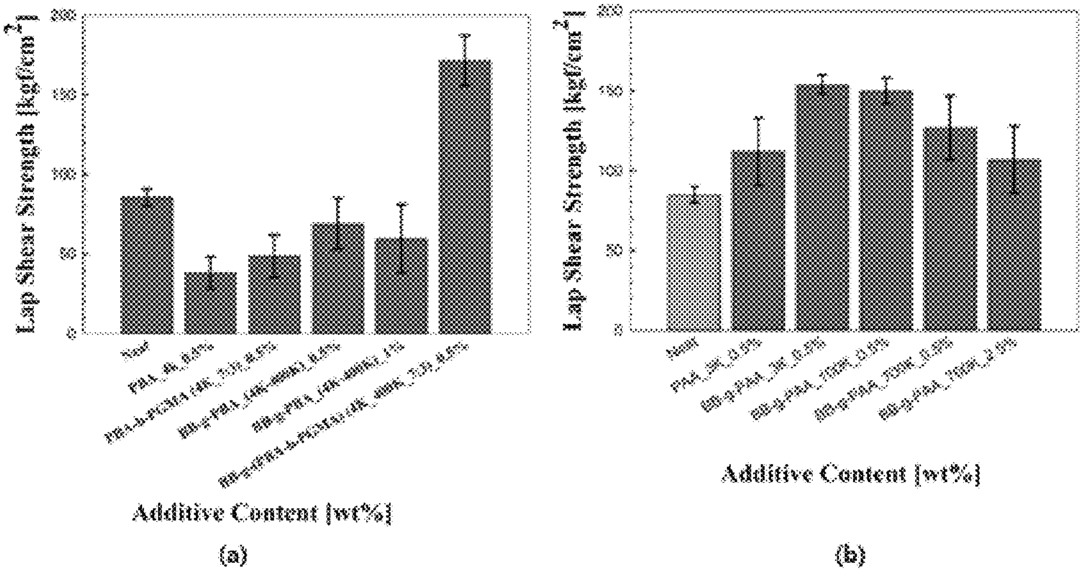
FIG. 8 is a lap shear strength test result of an epoxy adhesive according to an embodiment of the present disclosure.

The type, the molecular weight, and the content of the additive in the samples shown in (a) and (b) in FIG. 8 are shown in Table 4 and Table 5 below.

TABLE 4

| Number | Additive | Molecular weight (Side chain) | Block polymer-ization ratio | Content (weight %) |
|---|---|---|---|---|
| Sample 1 | PBA | 4K | — | 0.5 |
| Sample 2 | PBA-b-PGMA | 4K | 7:3 | 0.5 |
| Sample 3 | BB-g-PBA | 400K(4K) | — | 0.5 |
| Sample 4 | BB-g-PBA | 400K(4K) | — | 1 |
| Sample 5 | BB-g-(PBA-b-PGMA) | 400K(4K) | 7:3 | 0.5 |

TABLE 5

| Number | Additive | Molecular weight (Side chain) | Content (weight %) |
|---|---|---|---|
| Sample 6 | PAA | 3K | 0.5 |
| Sample 7 | BB-g-PAA | 3K(1K) | 0.5 |
| Sample 8 | BB-g-PAA | 100K(1K) | 0.5 |
| Sample 9 | BB-g-PAA | 700K(1K) | 0.5 |
| Sample 10 | BB-g-PAA | 700K(1K) | 2.5 |

Referring to Table 4 and (a) in FIG. 8, it may be identified that the adhesive strength increased by about 200% when the bottle brush copolymer BB-g-(PBA-r-PGMA) was used as an additive. It is believed that this is because the PBA block has rubber properties to effectively absorb external impact via the cavitation and increases cohesion in the epoxy matrix to improve the adhesion. Furthermore, it is believed that this is because the miscibility thereof with epoxy is improved due to the PGMA block, so that the bottle brush copolymer is well mixed with the epoxy resin.

Furthermore, it is identified that the BB-g-PBA sample has the adhesive strength somewhat improved compared to that of the linear PBA sample, while the adhesive strength of the BB-g-PBA sample was lower than that of the case where only the epoxy resin was used. Furthermore, it may be identified that when the amount of BB-g-PBA as added is increased, the adhesive strength rather deteriorates. In other words, it may be identified that it is difficult to exhibit the effect of dispersing and absorbing external impact when only the PBA block is included in the additive even though the additive is the bottle brush copolymer.

Referring to Table 5 and (b) in FIG. 8, it was identified that when the bottle brush copolymer (BB-g-PAA) was used as the additive, the adhesion increased than when the linear PAA was used (Sample 6). This indicates that the carboxylic acid group of the PAA block effectively hydrogen-bonds with the substrate to significantly improve the adhesive strength. It may be identified that the adhesion of the linear PAA sample was improved, but the improvement effect was smaller than that in the BB-g-PAA sample. It is believed that this is due to the improved dispersibility of the bottle brush copolymer due to its structural advantage.

Dispersibility Evaluation

Figure 9:
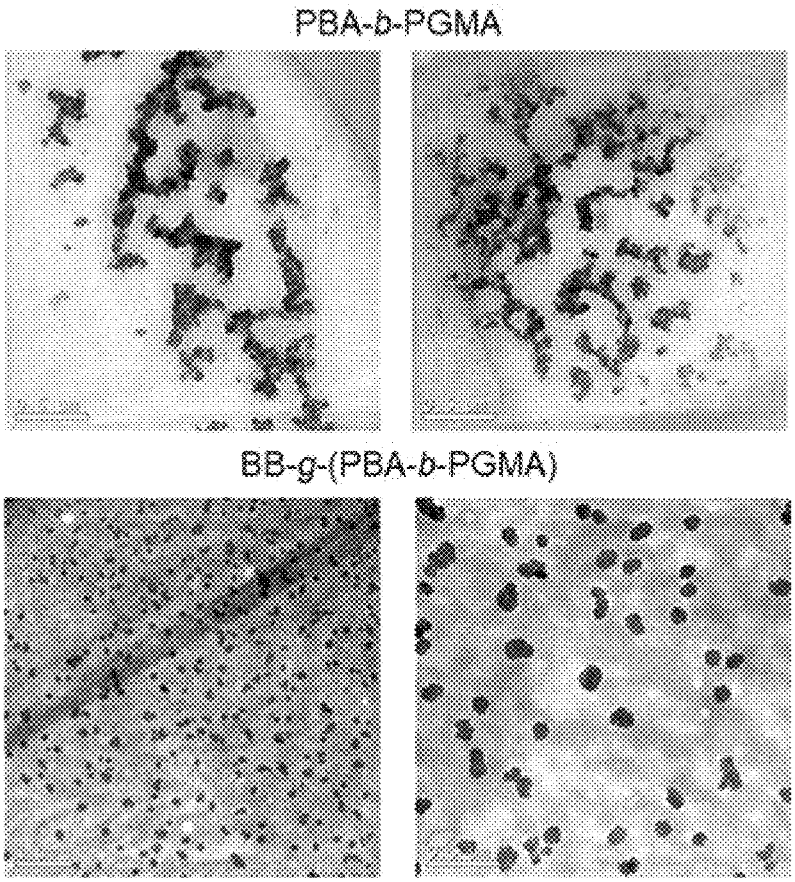
FIG. 9 is a TEM (Transmission Electron Microscopy) picture showing a state in which the bottle brush copolymer is dispersed in the epoxy resin.

In order to evaluate the state of the molding polymer in the epoxy resin, the sample 2 (PBA-b-PGMA) and the sample 5 (BB-g-(PBA-b-PGMA) were photographed using TEM (transmission electron microscope), and the results are shown in FIG. 9.

Referring to FIG. 9, it may be identified that the sample 2 includes a PGMA block, but has many portions that are partially aggregated. On the other hand, it may be identified that despite the fact that sample 5 has the same content of the PGMA block, the sample 5 is well dispersed without the aggregations due to the bottle brush structure.

The present disclosure has been described with reference to the Examples of the present disclosure. However, it may be appreciated that those of ordinary skill in the art may modify and change the present disclosure in various ways without departing from the spirit and scope of the present disclosure as described in the scope of the claims below.

What is claimed is:

1. An additive for an epoxy adhesive having a bottle brush structure that includes a core and a shell, wherein the bottle brush structure is formed by ring opening metathesis polymerization (ROMP) of a compound represented by Chemical Formula 1:

[Chemical Formula 1]

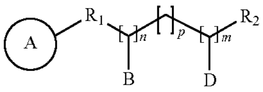

wherein in the Chemical Formula 1:

A represents a substituted or unsubstituted cycloalkene;

each of $R_1$ and $R_2$ independently represents substituted or unsubstituted $C_1$ to $C_{10}$ alkyl, alkyne, nitroxide, ester, ether, amine, substituted or unsubstituted $C_5$ to $C_{12}$ carbon ring, substituted or unsubstituted $C_3$ to $C_{12}$ heterocyclic ring, or a combination thereof;

each of B and D independently represents $C_2$ to $C_{10}$ alkyl acrylate, $C_2$ to C10 alkyl methacrylate, acrylic acid, glycidyl acrylate, glycidyl methacrylate, or ethylene glycol, with the provisos that:

B and D are not both a $C_2$ to $C_{10}$ alkyl acrylate, and;

B and D are not both a $C_2$ to $C_{10}$ alkyl methacrylate and;

p is an integer of 0 or 1 to 10, and each of n and m independently is an integer of 1 to 100.

2. The additive for the epoxy adhesive having the bottle brush structure of claim 1, wherein the cyclic compound A is represented by one of following Chemical Formulas:

(1)

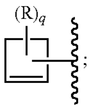

(2)

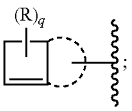

(3)

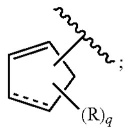

(4)

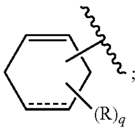

-continued (5)

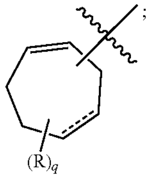

(6)

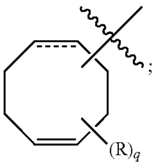

(7)

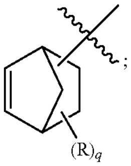

and (8)

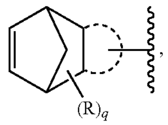

wherein in the above Chemical Formulas:

R represents halogen, hydroxy, carboxy, amine, or alkyl;

q is an integer from 0 or 1 to 6;

a dotted line in each of the Chemical Formulas (2) and (8) represents substituted or unsubstituted carbon ring or heterocyclic ring; and

means being connected to $R_1$.

3. The additive for the epoxy adhesive having the bottle brush structure of claim 1, wherein one of B and D is $C_2$ to $C_{10}$ alkyl acrylate, and the other thereof is glycidyl acrylate.

4. The additive for the epoxy adhesive having the bottle brush structure of claim 1, wherein each of B and D is acrylic acid.

5. The additive for the epoxy adhesive having the bottle brush structure of claim 1, wherein the additive for the epoxy adhesive having the bottle brush structure includes a unit represented by one of following Chemical Formulas:

(10)
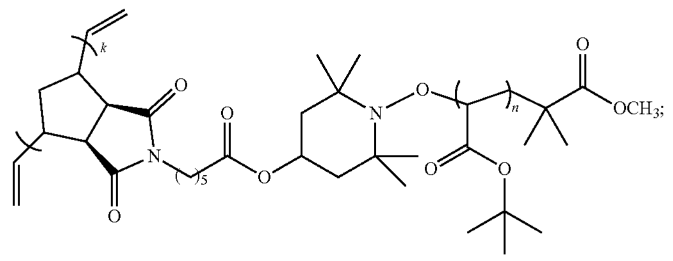
(20)
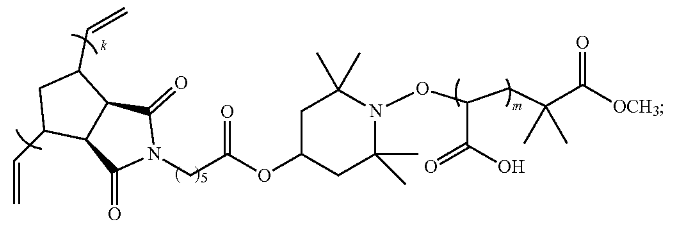
(30)
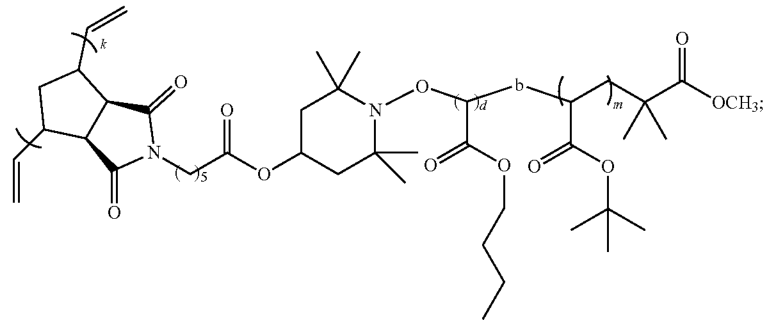
(40)
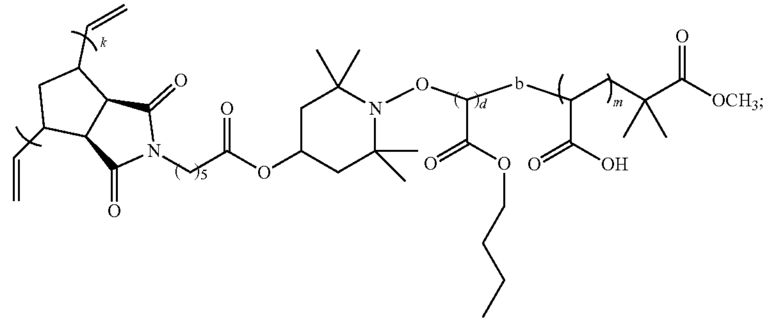
and

-continued

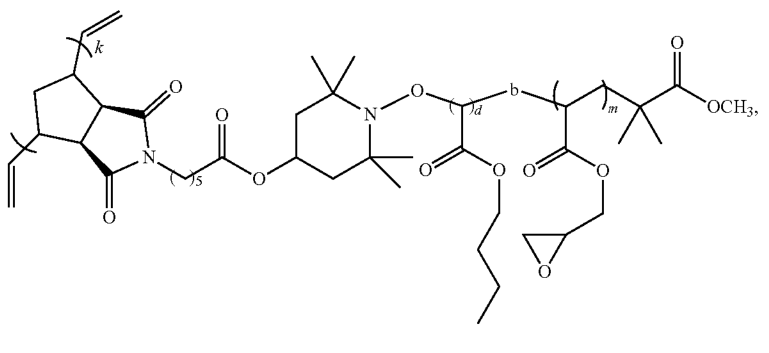

(50)

wherein in the above Chemical Formulas, k is an integer from 1 to 1000.

6. The additive for the epoxy adhesive having the bottle brush structure of claim 1, wherein the additive has a molecular weight in a range of 100 to 1,000K Da.

7. A composition for a structural epoxy adhesive, the composition comprising:

the additive for the epoxy adhesive having the bottle brush structure according to one of claims 1 to 6; and an epoxy resin.

* * * * *